(12) United States Patent
Hu

(10) Patent No.: US 8,231,515 B2
(45) Date of Patent: Jul. 31, 2012

(54) LIQUID-LIQUID SEPARATION DEVICE

(75) Inventor: Yunlong Hu, Shandong (CN)

(73) Assignee: Weihai Dengtong Purification Equipment Co., Ltd., Shandong (CN)

( * ) Notice: Subject to any disclaimer, the term of this patent is extended or adjusted under 35 U.S.C. 154(b) by 412 days.

(21) Appl. No.: 12/446,831

(22) PCT Filed: Sep. 27, 2007

(86) PCT No.: PCT/CN2007/070804
§ 371 (c)(1),
(2), (4) Date: Apr. 23, 2009

(87) PCT Pub. No.: WO2008/049359

PCT Pub. Date: May 2, 2008

(65) Prior Publication Data
US 2010/0059426 A1    Mar. 11, 2010

(30) Foreign Application Priority Data

Oct. 27, 2006    (CN) .......................... 2006 1 0069931

(51) Int. Cl.
*B04B 1/16* (2006.01)
(52) U.S. Cl. .......................................... 494/2; 494/901
(58) Field of Classification Search ................. 494/2, 3, 494/4, 901
See application file for complete search history.

(56) References Cited

U.S. PATENT DOCUMENTS

| | | | | |
|---|---|---|---|---|
| 2,022,814 A | * | 12/1935 | Strezynski | 494/3 |
| 2,712,896 A | * | 7/1955 | Boldrin | 494/4 |
| 3,623,658 A | * | 11/1971 | Garbaty | 494/3 |
| 4,402,680 A | * | 9/1983 | Schoendorfer | 494/3 |

FOREIGN PATENT DOCUMENTS

| | | |
|---|---|---|
| CN | 2221996 A | 3/1996 |
| CN | 1491751 A | 4/2004 |
| CN | 1970130 A | 5/2007 |

OTHER PUBLICATIONS

International Search Report of PCT/CN2007/070804, Mailing Date of Jan. 10, 2008.

* cited by examiner

*Primary Examiner* — Terry Cecil
(74) *Attorney, Agent, or Firm* — Westerman, Hattori, Daniels & Adrian, LLP

(57) ABSTRACT

This invention involves a liquid-liquid separation device, which includes a centrifugal cylinder. The centrifugal cylinder maintains a liquid inlet/outlet, and centripetal float valve inside, which is mounted on the wall of a cylinder that produces the centrifugal force. Liquids of various densities enter the centrifugal cylinder; under the action of centrifugal force, the liquid medium of the highest density moves to the cylinder wall first, while the liquids of lower densities follow in sequence; when the inward buoyant force that the float bears in the liquids of various densities is greater than the outward centrifugal force generated due to its own mass, the float will move inwards to open the passageway and discharge the heavy medium deposited on the cylinder wall, thus achieving the automatic separation.

2 Claims, 1 Drawing Sheet

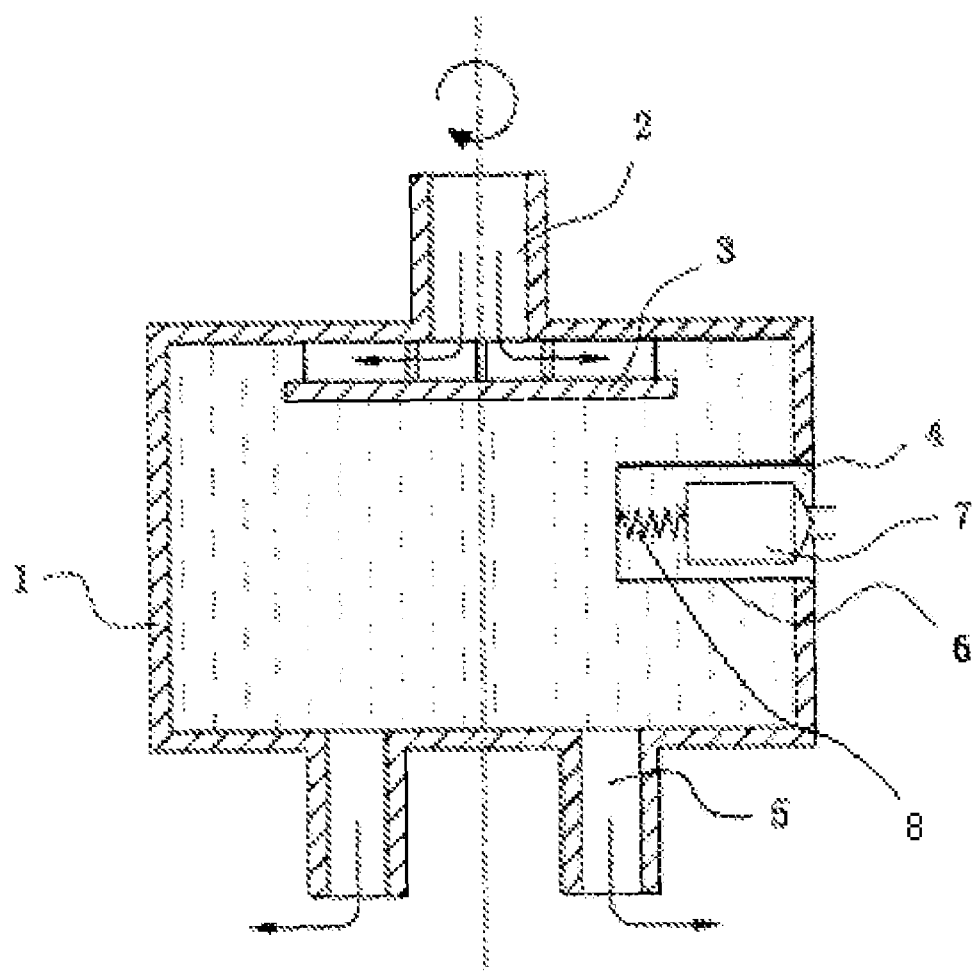

LIQUID-LIQUID SEPARATION DEVICE

TECHNICAL FIELD

This invention involves a separation device, more specifically, a liquid-liquid separation device being capable of automatically separating the liquid media of different densities during continuous process.

BACKGROUND TECHNOLOGIES

Currently, there are two modes with which a centrifugal machine removes heavy media. One is intermittent operation mode, in which the principle of gravity settlement is mainly adopted: the machine is stopped when the centrifugal cylinder is filled with heavy media, the heavy media settles into a special case in the natural state after a given period of time is passed; and the heavy media in the case is discharged through the valve. In this case, it is inevitable to frequently stop the machine. The other mode is the continuous operation mode, in which the principle of centrifugal separation is adopted: the outlet passageway of centrifugal separator is classified into heavy media passageway and light media passageway, the latter being close to the rotating shaft of centrifugal separator, while the former being close to the outside. In this mode, it is necessary to set a specific gravity ring in the heavy media passageway (manufacturing of the specific gravity ring is under restriction of such conditions as temperature, density and oil liquid), and the specific gravity ring has extremely strict requirements on temperature and density. In the event that the liquid is a mixture of light and heavy media, the specific gravity ring needs a real-time manual adjustment and the machine has to be periodically stopped as the heavy media is discharged constantly.

CONTENTS OF THE INVENTION

An object of the invention is to overcome the above shortcomings in the arts, and provide a liquid-liquid separation device that is capable of automatically separating the liquid media of different densities during whole process without stopping and breaking through the volumetric restriction after liquid media of different densities is separated in a centrifugal cylinder.

This invention may be implemented through the following measures:

A liquid-liquid separation device, which includes a centrifugal cylinder having a liquid inlet and a liquid outlet, a centripetal float valve is provided inside the centrifugal cylinder and mounted on the wall of the centrifugal cylinder.

The centripetal float valve of this invention comprises a float body and a valve base, the float body is arranged in inside the valve base and connected to through hole provided in the wall of the centrifugal cylinder. The valve seat may be directly formed by machining on the wall of centrifugal cylinder.

Due to the above described structure of this invention, the liquids of different densities flow into the centrifugal cylinder; under the action of centrifugal force, the liquid medium of the higher density moves to the cylinder wall while the liquids of lower densities move to the central portion of the cylinder; when the inward buoyant force that the float body bears in the liquids of various densities overcomes the outward centrifugal force generated due to its own mass, the float body will move inwards to open the passageway and discharge the heavy medium deposited on the cylinder wall outside the cylinder, thus achieving the automatic separation; when the heavy media are discharged one by one, and the remaining light media are insufficient to overcome the outward centrifugal force that the float body produces due to its mass, the float body will move outwards to close the passageway; a small amount of heavy media continues to settle on the wall of centrifugal cylinder through centrifugal separation, and when a certain density is reached, the float will again open the passageway. This is reciprocal, until the separation is completely finished.

EXPLANATION TO THE ATTACHED DRAWINGS

FIG. 1 is a diagram showing the structure of this invention.

SPECIFIC EMBODIMENTS

With reference to the attached drawings, this invention is further described as follows.

As shown in the FIG. 1, a liquid-liquid separation device includes a centrifugal cylinder 1. The centrifugal cylinder 1 has a liquid inlet 2, outlet 5, and a separation plate 3 is provided in the centrifugal cylinder 1. The separation plate 3 is close to the liquid inlet 2 and contacted with the centrifugal cylinder 1. On the wall of the centrifugal cylinder 1, one or more centripetal float valve(s) 4 is/are provided. The centripetal float valve 4 is classically mounted in the middle of the centrifugal cylinder 1, or alternatively in the upper or lower part of the centrifugal cylinder 1. The centripetal float valve 4 comprises a valve base and float body 7. The float body 7 is located inside the valve base 6, and contacted to the through holes formed by machining the wall of the centrifugal cylinder 1, and the quantity and size of the through holes are determined according to the quantity of the centripetal float valves 4. Alternatively, the valve base may be formed by directly machining on the cylinder wall. The float body 7 is connected with the valve base 6 by a coil spring 8 imparting biasing force in the centrifugal direction with respect to said float body 7, and may be of various shapes, such as sphere, cylinder, cone or a combination of them. During operation, the liquids of different densities flow into the centrifugal cylinder, and under the action of centrifugal force, the liquid of the higher density moves to the cylinder wall while the liquids of lower densities move to the center of the cylinder. When the inward buoyant force that the float bears in the liquids of various densities overcomes the outward centrifugal force generated due to its own mass, the float body will move inwards to open the passageway and discharge the heavy medium deposited on the cylinder wall. By such action, automatic separation is achieved.

Industrial Applicability

This invention may be applied to oil liquid purification, food processing, oil-water separation, automatic washing, sewage treatment, filtering separation, lubrication, metallurgy, petrochemical, traffic & transportation, mechanical processing, and other industries.

The invention claimed is:
1. A liquid-liquid separation device, comprising a centrifugal cylinder, said cylinder including top and bottom walls and a sidewall extending therebetween and parallel with an axis of rotation, said cylinder having an internal sidewall and a liquid inlet and a liquid outlet, the liquid-liquid separation device is characterized in that a centripetal float valve is provided inside the centrifugal cylinder and mounted on the internal side wall of said centrifugal cylinder;
    wherein the centripetal float valve comprises a float body and a valve base, and the float body is inside the valve base and contacted to a through hole provided in the side wall of the centrifugal cylinder;
wherein said float body is connected with said valve base by a coil spring imparting biasing force in the centrifugal direction with respect to said float body.

2. A liquid-liquid separation device according to claim 1 characterized in that said base is formed by machining on the cylinder wall.

* * * * *